(12) United States Patent
Michalak et al.

(10) Patent No.: US 9,233,627 B2
(45) Date of Patent: Jan. 12, 2016

(54) ELECTRO-MECHANICAL PUSH BUTTON VEHICLE SEAT ACTUATION MECHANISM

(75) Inventors: Eric B. Michalak, Northville, MI (US);
Joseph Rajkumar, Ypsilanti, MI (US);
Mark Kowalski, Belleville, MI (US);
Vijay Havali, Westland, MI (US);
Jeffrey P. Medvecky, Brighton, MI (US)

(73) Assignee: Johnson Controls Technology Company, Holland, MI (US)

( * ) Notice: Subject to any disclaimer, the term of this patent is extended or adjusted under 35 U.S.C. 154(b) by 265 days.

(21) Appl. No.: 13/700,768

(22) PCT Filed: Jun. 23, 2011

(86) PCT No.: PCT/US2011/041686
§ 371 (c)(1),
(2), (4) Date: Feb. 6, 2013

(87) PCT Pub. No.: WO2011/163516
PCT Pub. Date: Dec. 29, 2011

(65) Prior Publication Data
US 2013/0200668 A1 Aug. 8, 2013

Related U.S. Application Data

(60) Provisional application No. 61/358,252, filed on Jun. 24, 2010.

(51) Int. Cl.
A47C 7/62 (2006.01)
A47C 31/00 (2006.01)
(Continued)

(52) U.S. Cl.
CPC B60N 2/20 (2013.01); B60N 2/002 (2013.01);
B60N 2/0232 (2013.01); B60N 2/06 (2013.01);
B60N 2/12 (2013.01); B60N 2/22 (2013.01);
B60N 2/3009 (2013.01); B60N 2/3065 (2013.01)

(58) Field of Classification Search
CPC .......... B60N 2/12; B60N 2/20; B60N 2/2002; B60N 2/22; B60N 2/3065; B60N 2/3011
USPC .......... 297/217.1, 341, 378.12, 378.14, 378.1
See application file for complete search history.

(56) References Cited

U.S. PATENT DOCUMENTS 4,159,815 A * 7/1979 Strowik et al. ................. 248/429
4,615,551 A * 10/1986 Kinaga et al. ................. 297/341
(Continued)

FOREIGN PATENT DOCUMENTS

| CN | 101284500 A | 10/2008 |
|---|---|---|
| JP | 04-160693 B2 | 6/1992 |

(Continued)

OTHER PUBLICATIONS

Form PCT/ISA/210, International Search Report, Dated Nov. 16, 2011.
(Continued)

*Primary Examiner* — Daniel J Troy
*Assistant Examiner* — Kimberley S Wright
(74) *Attorney, Agent, or Firm* — Butzel Long

(57) ABSTRACT

A vehicle seat having a seat back pivotably coupled to a seat base by a seat recliner mechanism such that the seat back can be pivoted in a forward and rearward direction relative the seat base. The seat includes a track assembly coupled to the vehicle and the seat, such that the seat can be moved in the forward and rearward directions relative to the vehicle interior. The seat further includes an actuator mechanism having a first actuator that includes a push button located on the seat and an actuator in electrical communication with the push button, A force transmitting device has one end connected to the actuator and a second end connected to the seat recliner mechanism, such that energizing the actuator actuates the force transmitting device to release the seat recliner mechanism and move the seat between a use and a tipped and forward position.

10 Claims, 19 Drawing Sheets

(51) Int. Cl.
*B60N 2/20* (2006.01)
*B60N 2/02* (2006.01)
*B60N 2/12* (2006.01)
*B60N 2/30* (2006.01)
*B60N 2/00* (2006.01)
*B60N 2/06* (2006.01)
*B60N 2/22* (2006.01)

(56) References Cited

U.S. PATENT DOCUMENTS

| | | | |
|---|---|---|---|
| 4,720,143 A * | 1/1988 | Schwartz et al. | 297/326 |
| 5,150,632 A * | 9/1992 | Hein | 74/530 |
| 5,348,373 A * | 9/1994 | Stiennon | 297/344.1 |
| 5,435,624 A * | 7/1995 | Bray et al. | 297/362.11 |
| 5,597,206 A * | 1/1997 | Ainsworth et al. | 297/378.12 |
| 6,010,190 A * | 1/2000 | Downey | 297/340 |
| 6,074,009 A * | 6/2000 | Farino | 297/378.14 |
| 6,152,533 A * | 11/2000 | Smuk | 297/341 |
| 6,216,995 B1 * | 4/2001 | Koester | 248/429 |
| 6,255,790 B1 * | 7/2001 | Popp et al. | 318/280 |
| 6,336,679 B1 * | 1/2002 | Smuk | 297/378.12 |
| 6,540,295 B1 | 4/2003 | Saberan et al. | |
| 6,857,702 B2 * | 2/2005 | Becker et al. | 297/341 |
| 7,025,419 B2 * | 4/2006 | Sasaki et al. | 297/344.11 |
| 7,152,923 B2 * | 12/2006 | Charras et al. | 297/378.12 |
| 7,320,501 B2 * | 1/2008 | Keyser et al. | 297/378.12 |
| 7,434,884 B2 * | 10/2008 | Becker et al. | 297/341 |
| 7,460,005 B2 * | 12/2008 | Nathan et al. | 340/5.61 |
| 7,631,938 B2 * | 12/2009 | Tomandl | 297/336 |
| 7,808,394 B2 * | 10/2010 | Nathan et al. | 340/667 |
| 7,857,392 B2 * | 12/2010 | Hayakawa et al. | 297/378.14 |
| 7,959,230 B2 * | 6/2011 | Hentges et al. | 297/378.12 |
| 8,047,595 B2 * | 11/2011 | Bach | 296/65.08 |
| 8,066,327 B2 * | 11/2011 | Tomandl | 297/326 |
| 8,376,459 B2 * | 2/2013 | Kumazaki et al. | 297/341 |
| 8,424,971 B2 * | 4/2013 | Hentges et al. | 297/378.12 |
| 8,439,444 B2 * | 5/2013 | Ngiau | 297/378.12 |
| 8,585,145 B2 * | 11/2013 | Nock et al. | 297/341 |
| 8,628,145 B2 * | 1/2014 | Parida et al. | 297/481 |
| 8,662,589 B2 * | 3/2014 | Suzuki et al. | 297/378.12 |
| 8,757,722 B2 * | 6/2014 | Gupte et al. | 297/378.12 |
| 2004/0262971 A1 * | 12/2004 | Hentges et al. | 297/378.12 |
| 2007/0013218 A1 * | 1/2007 | Kayumi et al. | 297/344.1 |
| 2007/0018839 A1 * | 1/2007 | Nathan et al. | 340/667 |
| 2007/0018840 A1 * | 1/2007 | Nathan et al. | 340/667 |
| 2007/0265738 A1 * | 11/2007 | Saito | 701/2 |
| 2008/0024316 A1 * | 1/2008 | Nathan et al. | 340/667 |
| 2008/0067851 A1 | 3/2008 | Tomandl | |
| 2008/0073960 A1 * | 3/2008 | Nakaya et al. | 297/341 |
| 2008/0252126 A1 * | 10/2008 | Bartoi et al. | 297/341 |
| 2009/0079240 A1 * | 3/2009 | Bach | 297/217.3 |
| 2009/0096270 A1 | 4/2009 | Halbig et al. | |
| 2010/0164265 A1 * | 7/2010 | Tomandl | 297/326 |
| 2010/0225151 A1 | 9/2010 | Michalak et al. | |
| 2011/0127818 A1 * | 6/2011 | Hazlewood | 297/341 |
| 2012/0056459 A1 * | 3/2012 | Harden | 297/316 |

FOREIGN PATENT DOCUMENTS

| | | |
|---|---|---|
| JP | 07-277628 | 10/1995 |
| JP | 55-68632 B2 | 8/2014 |

OTHER PUBLICATIONS

Patent abstract of CN101284500, publication date Oct. 15, 2008, Title: Power actuated easy entry seat, 1 page.
Chinese Office Action dated Oct. 8, 2014, 11 pages.
Japanese Office Action, dated Nov. 26, 2014, 4 pages.
Patent abstract for JP 07-277628, date of publication of application: Oct. 24, 1995, 1 page.
Patent abstract for JP 04-160693, date of publication of application: Jun. 3, 1992, 1 page.
Patent abstract for JP5568632, corresponding document DE102009021211, Nov. 18, 2010, 2 pages.

* cited by examiner

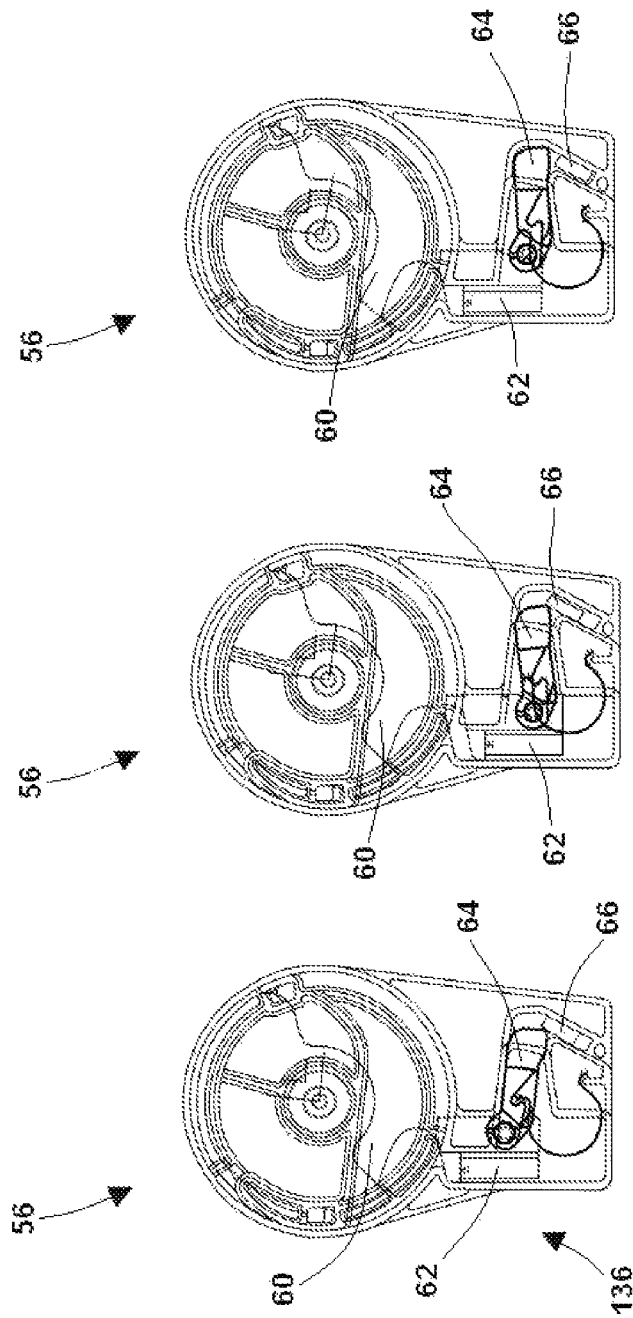

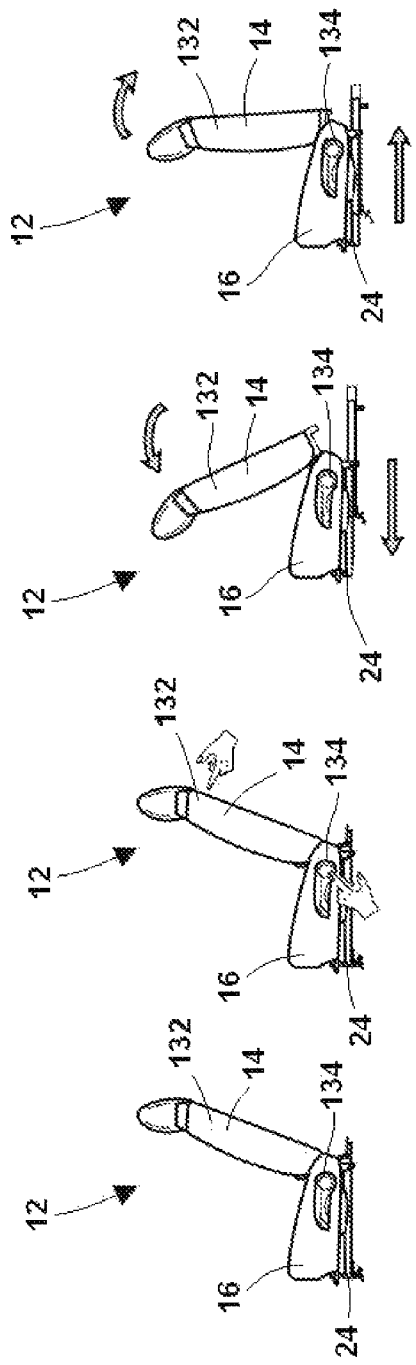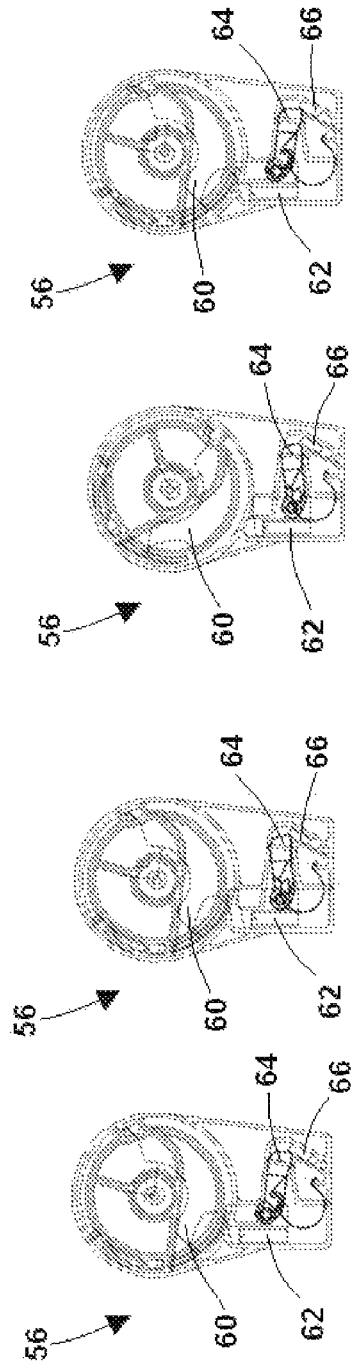
FIG.15A FIG.15B FIG.15C FIG.15D

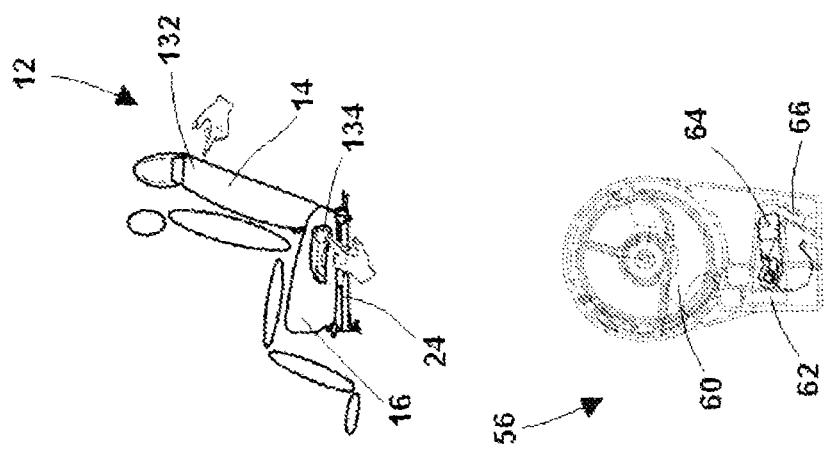
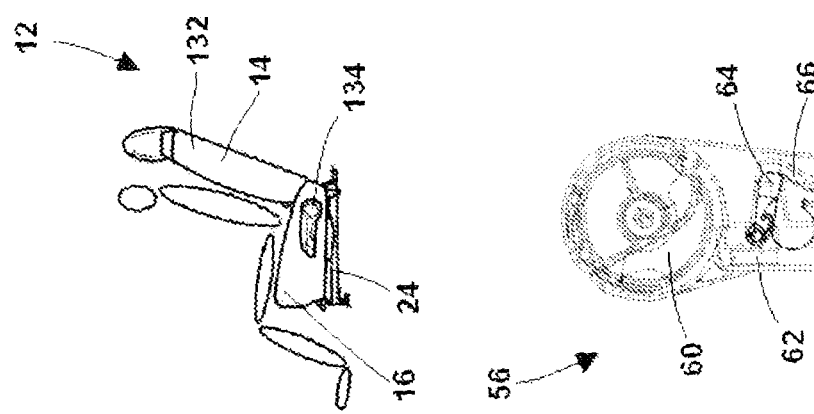

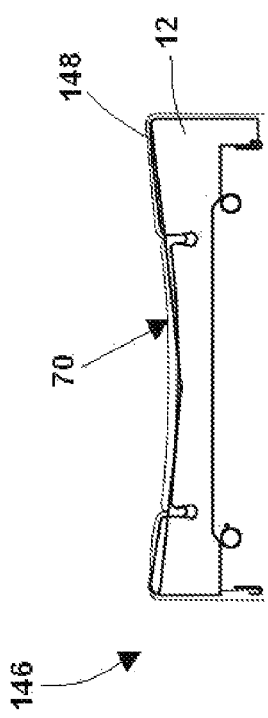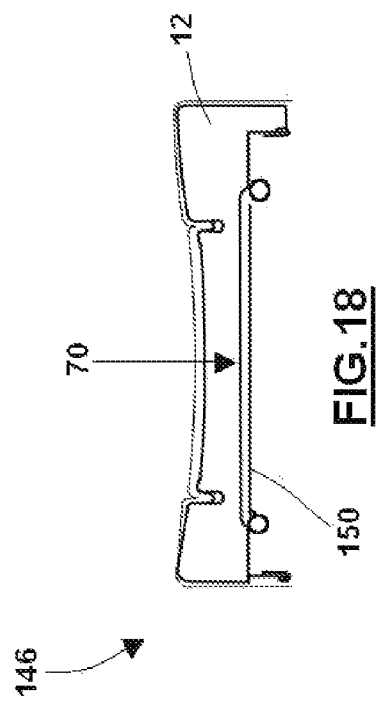

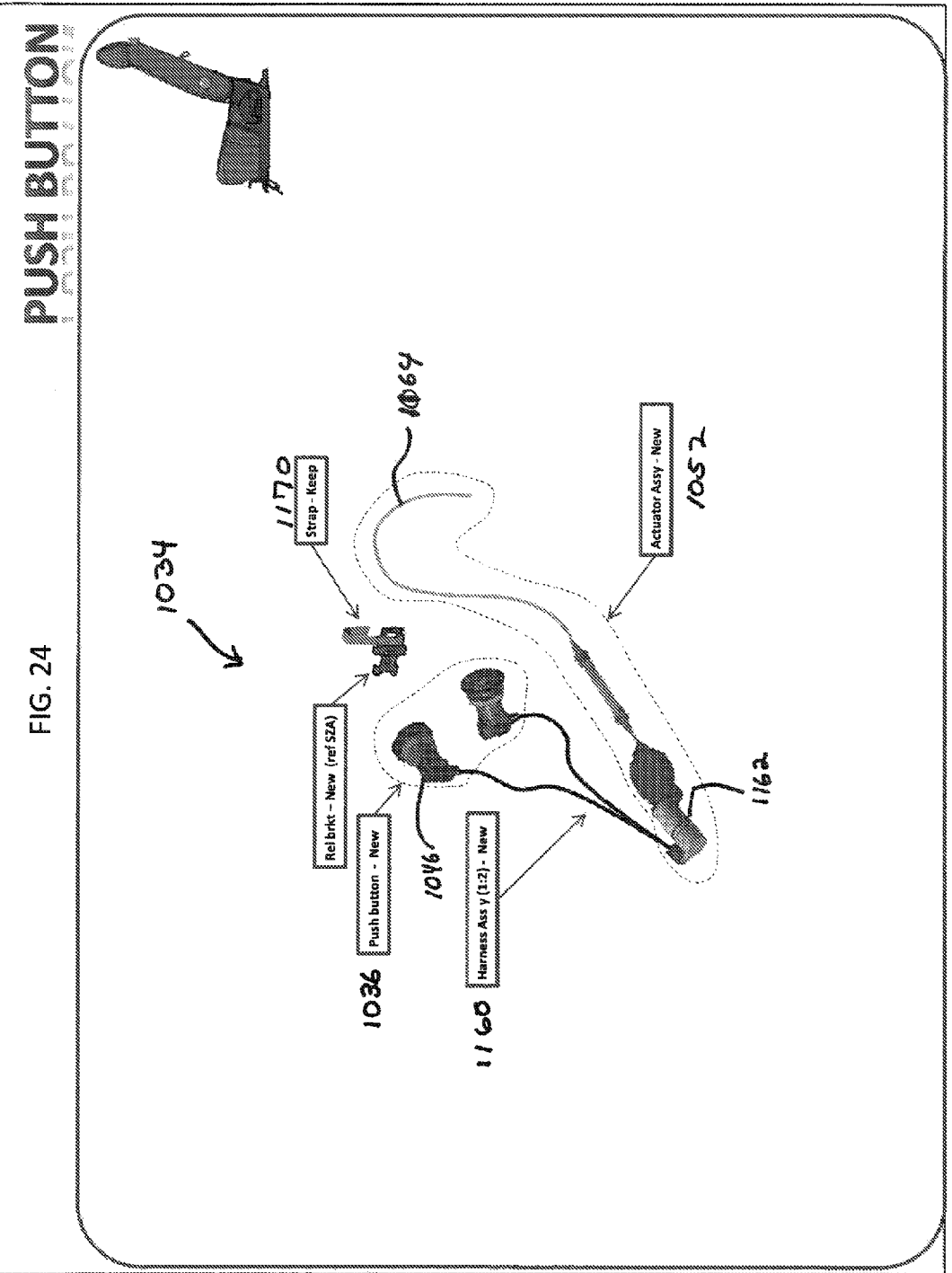

FIG. 25

Actuation Mechanism Options

Seat latch mechanical specification.
Minimum operating effort = 55N ~ 60N
Minimum travel requirement = 25mm
~ 11 lbs 1- Motor + Worm
2- Housing
3- 1st stage gear
4- Second stage gear
5- Third stage gear
6- Output gear/pulley
7- Cap
8- Spring ASM.
9- Cable ASM. 164

| | Option #1 Remote Release Act System | Option #2 Integrated Remote Release Act. System | Option #3 Small Integrated Remote Release Act. System |
|---|---|---|---|
| Actuator Type | RRAS type actuator with spring cable design to allow for actuator back drive | RRAS type actuator integrated with torsion spring design to allow for actuator back drive | L&V Li type actuator integrated to a rack and pinion type actuator |
| Back drive Mechanism | Power cable with return spring assembly | Torsion spring integrated in to the RRAS actuator cap | Return spring integrated in to rack and pinion housing |
| Packaging Size | Length = 172 mm<br>Width = 129mm<br>Thickness = 45mm | Length = 172 mm<br>Width = 129mm<br>Thickness = 45mm | Estimated<br>Length = 135 mm<br>Width = 82mm<br>Thickness = 45mm |

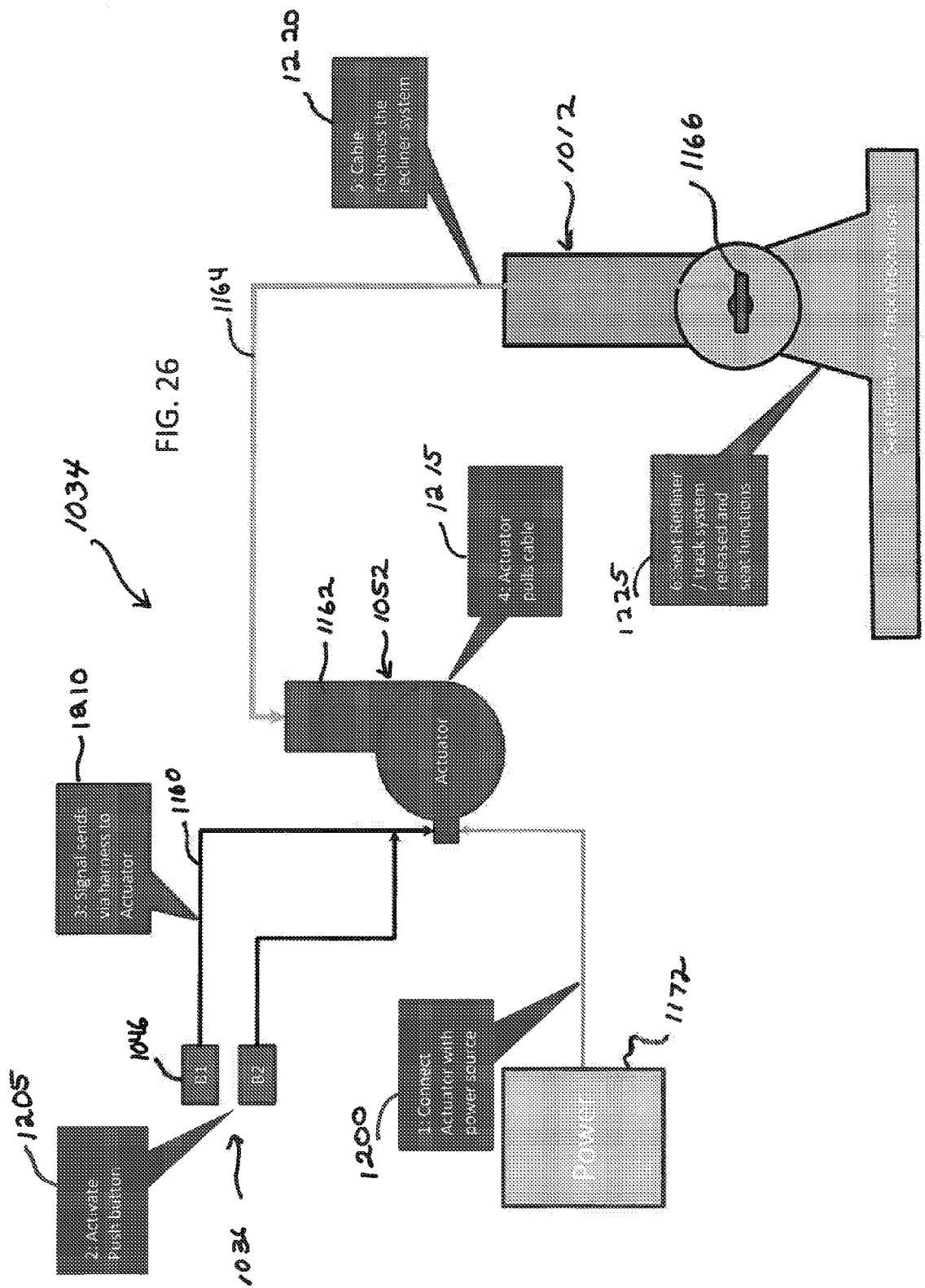

ELECTRO-MECHANICAL PUSH BUTTON VEHICLE SEAT ACTUATION MECHANISM

CROSS REFERENCE TO RELATED APPLICATIONS

This application claims the benefit of and priority to U.S. Provisional Application No. 61/358,252, filed Jun. 24, 2010, which is incorporated herein by reference.

BACKGROUND

The present disclosure relates generally to improvements to a vehicle seat. More particularly, the present disclosure relates to improvements relating to a vehicle seat having an electro-mechanical actuation mechanism for adjusting the vehicle seat and a recliner energy device bypass mechanism.

DESCRIPTION OF THE RELATED ART

It is generally known to provide adjustable vehicle seats. Further, it is generally known to provide an adjustable track assembly for adjusting the fore-aft position of the vehicle seat within the vehicle. Such a track assembly is known for use in providing fore-all adjustment to vehicle seats such a "captain's chair" or other type of vehicle seats. The linear adjustable vehicle seat allows an occupant to obtain a more comfortable seating position and to provide space behind or in front of the vehicle seat. Generally, actuation mechanisms are known for actuating the recliner mechanism so that the seat can be adjusted in the fore-aft direction along the seat track and so the seat back can be adjusted in the fore-aft direction. Such actuation mechanisms are generally known as levers or handles.

It is also generally known to use a recliner mechanism in a vehicle seat to allow a seat occupant to adjust the position of the seat back with respect to the seat base. Such known recliner mechanisms can typically be actuated by the seat occupant to selectively adjust the angular position of the seat back with respect to the seat base. Various vehicle seats have been developed with seat back adjusting or reclining mechanisms that provide for the reclining angle of the seat back to be adjusted, that provide for rotation of the seat back to a forward position, including a dump position, for easy entry (EZ entry) to the area of the vehicle behind the vehicle seat. Such reclining mechanisms can also provide for rotation of the seat back to a stow flat position over the seat bottom for storage of the seat within the vehicle or for storage of the seat when removed from the vehicle. Known vehicle seats also can include a stored energy and release control device for facilitating reconfiguration of the vehicle seat with reduced input force by a user. When such known energy storage devices are activated, whether intentionally or unintentionally, the recliner mechanism can be released regardless of whether the seat is occupied or unoccupied. The seat must be cycled back to a fully dumped (EZ entry/folded) position and then returned back to a design (use) position to re-engage the recliner thereby creating a number of issues, such as safety. Various embodiments of such energy storage devices are set forth in the following U.S. patent application, which is incorporated herein by reference: U.S. Pat. App. No. 2008/0067851, filed Aug. 22, 2007, Tomandl. In addition, commonly assigned U.S. Provisional Patent Application No. 61/157,481, filed Mar. 4, 2009, titled: VEHICLE SEAT ACTUATION MECHANISM, in the name of Laframboise et al. and U.S. Provisional Patent Application No. 61/256,175, filed Oct. 29, 2009, titled: ENERGY DEVICE BYPASS MECHANISM, in the name of Seibold et al.; and U.S. patent application Ser. No. 12/716,708 filed Mar. 3, 2010, all of which are incorporated by reference herein.

Thus there remains a continuing need to provide an improved seat and in particular, a vehicle seat that is easier to operate and/or adjust and that requires less effort and force to operate and/or adjust. There also remains a continuing need to provide an energy storage and release control system that facilitates ingress and egress into the vehicle, enhances safety, and is also relatively simple in design.

SUMMARY

A seat for use in a vehicle having a seat back pivotably coupled to a seat base by a recliner mechanism such that the seat back can be pivoted in a forward and rearward direction relative the seat base. The seat also includes a track assembly coupled to the vehicle and the seat, such that the seat can be moved in the forward and rearward directions relative to the vehicle interior. The seat also includes an electro-mechanical actuator mechanism having a first actuator, a second actuator, and an energy storage device for storing energy generated from movement of the seat and selectively releasing the stored energy to assist in repositioning the seat when at least one of the first actuator and second actuator is actuated. Actuating the first actuator causes the seat to move from a first position to a second position, and actuating the second actuator causes the seat to move from a first position to a third position.

A seat for use in a vehicle having a seat back pivotably coupled to a seat base by a recliner mechanism such that the seat back can be pivoted in a forward and rearward direction relative the seat base. The seat also includes a track assembly coupled to the vehicle and the seat, such that the seat can be moved in the forward and rearward directions relative to the vehicle interior. The seat also includes an actuator mechanism having a first actuator, a second actuator, and an energy storage device such as an actuator or motor, for storing energy generated from movement of the seat and selectively releasing the stored energy to assist in repositioning the seat when at least one of the first actuator and second actuator is actuated. Actuating the first actuator using a push button causes the seat to move from a first position to a second position by operation of the motor and a force transmitting device connected to the seat release mechanism, and actuating the second actuator causes the seat to move from a first position to a third position. The seat can also include an energy bypass mechanism that prevents the release of stored energy in the energy storage device when the seat is occupied and enables the release of stored energy in the energy device when the seat is not occupied.

An advantage of the present disclosure is that the vehicle seat utilizes an electro-mechanical actuator for easily controlling operation of the seat. Another advantage of the present disclosure is that the electro-mechanical actuator prevents unintended movement of the seat. Still a further advantage of the present disclosure is that a method of operating the vehicle seat using the electro-mechanical actuator is easy to operate and adjust. Yet a further advantage of the present disclosure is that the electro-mechanic actuator enhances safety by reducing the risk of injury to seat occupants through unintentional movement of the seat.

Other features and advantages of the present disclosure will be readily appreciated, as the same becomes better under-

BRIEF DESCRIPTION OF THE DRAWINGS

FIGS. 14A-14C are a series of side views of the energy storage bypass mechanism in an initial mode, an activated mode with the seat unoccupied, and an activated mode with the seat occupied, according to an exemplary embodiment.

FIGS. 15A-15D are a progression of side views of the energy storage bypass mechanism and corresponding seat configuration transitioned between a design position and a reclined position and back to a design position, according to an exemplary embodiment.

FIGS. 16A-16B are side views of an occupied seat and of the energy storage bypass mechanism transitioned from a non-activated mode to an activated mode, according to an exemplary embodiment.

FIG. 17 is a diagram of a seat occupant detection system, according to an exemplary embodiment.

FIG. 18 is a diagram of a seat occupant detection system, according to another embodiment.

FIG. 24 is another view of the electro-mechanical push button actuator for the vehicle seat of FIG. 22, according to an exemplary embodiment.

FIG. 25 is diagrams illustrating various examples of the electro-mechanical push button actuator for the vehicle seat of FIG. 22, according to an exemplary embodiment.

FIG. 26 is a flow chart illustrating a method of operating a vehicle seat using the electro-mechanical push button actuator for the vehicle seat of FIG. 22.

DESCRIPTION

Figure 1:
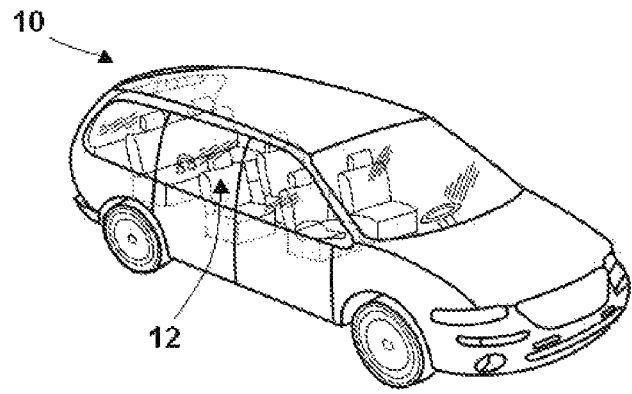
FIG. 1 is a perspective view of a vehicle including a vehicle seat, according to an exemplary embodiment.

Referring generally to the FIGURES and particularly to FIG. 1, a vehicle 10 is shown according to an exemplary embodiment. The vehicle 10 can include one or more seat assemblies 12 provided for occupants of the vehicle 10. While the vehicle 10 shown is a four door sedan, it should be understood that the seat assembly 12 can be used in a mini-van, sport utility vehicle, airplane, boat, or any other type of vehicle.

Figure 2:
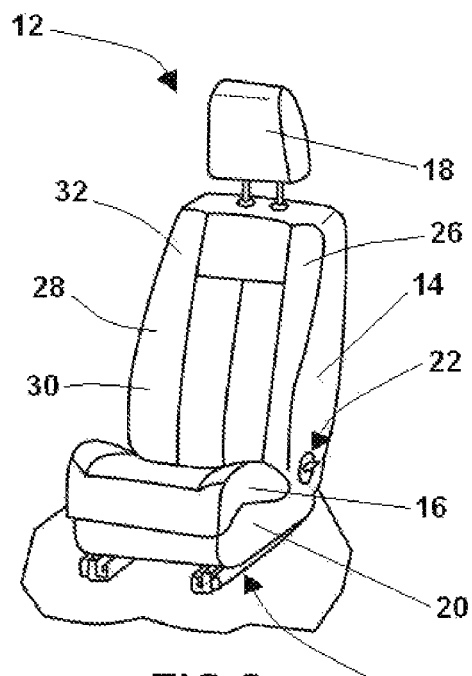
FIG. 2 is a perspective view of a vehicle seat of the vehicle of FIG. 1.

Referring now to FIG. 2, an example of a seat assembly 12 is shown. The seat assembly 12 includes a seat back 14 operatively connected to a seat base 20 that supports a seat cushion 16. The seat back 14 and seat base 20 provide comfort, support and protection to the seated occupant. A head restraint 18 is positioned at an upper end of the seat back 14 and also provides comfort, support and protection to the seated occupant. The seat assembly 12 can also include a recliner mechanism 22 having an actuator operatively connected to the seat back 14 and seat base 20, to provide rotatable adjustability of the seat back 14 with respect to the seat base 20. The seat assembly 12 can also be secured to the vehicle 10 using a track assembly 24. In this example, the track assembly 24 enables the seat assembly to be repositioned relative the vehicle floor to enhance comfort and utility. The seat 12 can also include additional features, such as, side bolsters 26, 28, a plurality of cushions 30, seat/trim cover 32, or the like.

Figure 3:
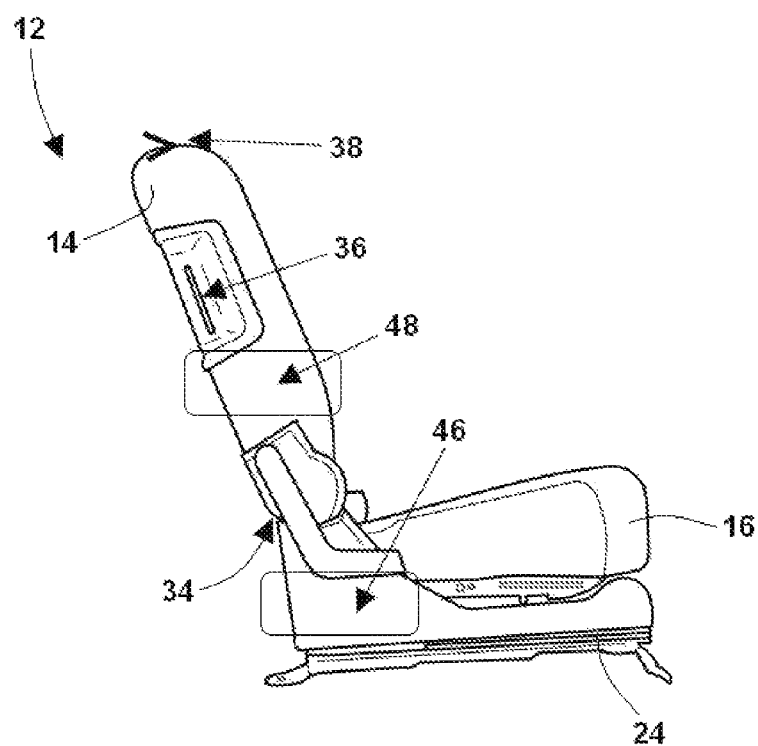
FIG. 3 is a side view of a vehicle seat according to an exemplary embodiment.
Figure 4:
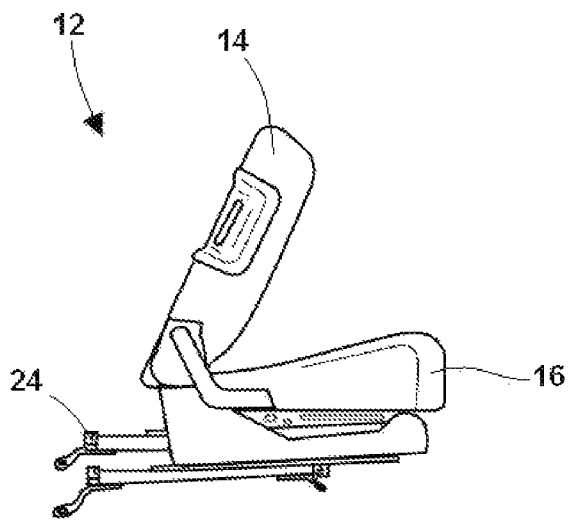
FIG. 4 is a side view of the vehicle seat of FIG. 3 in an easy entry position.
Figure 5:
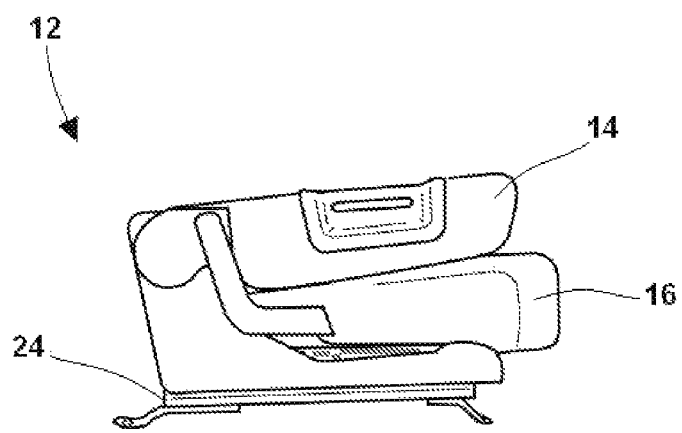
FIG. 5 is a side view of the vehicle seat of FIG. 3 in a fold flat position.

Referring now to FIGS. 3-5, a vehicle seat 12 according to an exemplary embodiment is shown. The vehicle seat 12 includes an actuation mechanism 34 having a first and second seat actuator 36, 38 that are used to adjust the vehicle seat 12 and can be in the form of a handle, lever, button, push button, or the like. The first actuator 36 operates to actuate the seat 12 such that the seat back 14 is tipped in a forward direction and the entire seat 12 is slid forward on the seat track assembly 24 that is coupled to the vehicle 10, as shown in FIG. 4. This reconfigures the seat 12 from a use position at 40 to an easy entry position at 42 that facilitates vehicle 10 ingress and egress, enhances interior cargo space, or the like. The second actuator 38 operates to actuate the seat 12 such the seat back 14 is folded forward such that the seat back 14 rests substantially flat on the top surface of the seat cushion 16, as shown in FIG. 5. This places the seat 12 in a fold-flat position at 44 that facilitates vehicle 10 ingress and egress and even further enhances interior cargo space. The first and second actuators 36, 38 can also be located elsewhere on the seat back 14, seat base 16, or the like.

According to another embodiment, push buttons are used for the first and second actuators 46, 48. In one example, the first push button 46 can be located on either the inboard or outboard side of the seat base 16 and towards the rear portion of the seat base 16, whereas the second push button 48 can be located on either the inboard or outboard side of the seat back 14 and towards the lower end of the sat back 14, as shown in FIG. 3. The first and second push buttons 46, 48 can also be located elsewhere on the seat back 14, seat base 16, or the like. Although the seat 12 shown is a second row seat, any suitable seat may be used, such as, a first row seat, a passenger seat, a driver's seat, a bench seat, or the like.

Figure 6:
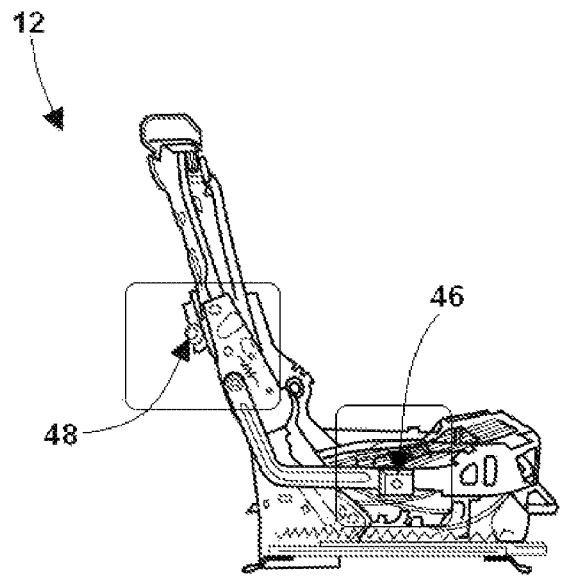
FIG. 6 is a side view of the vehicle seat having a push button actuation mechanism for actuating the vehicle seat, according to an exemplary embodiment.
Figure 7:
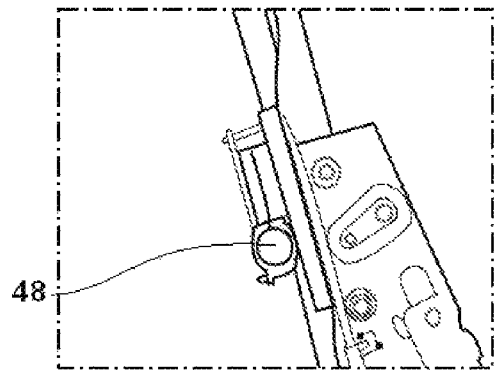
FIG. 7 is a partial enlarged view of the first push button actuator of the vehicle seat of FIG. 6.
Figure 9:
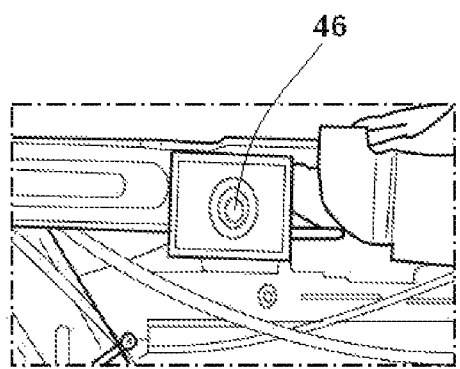
FIG. 9 is a partial enlarged view of the second push button actuator of the vehicle seat of FIG. 6.
Figure 8:
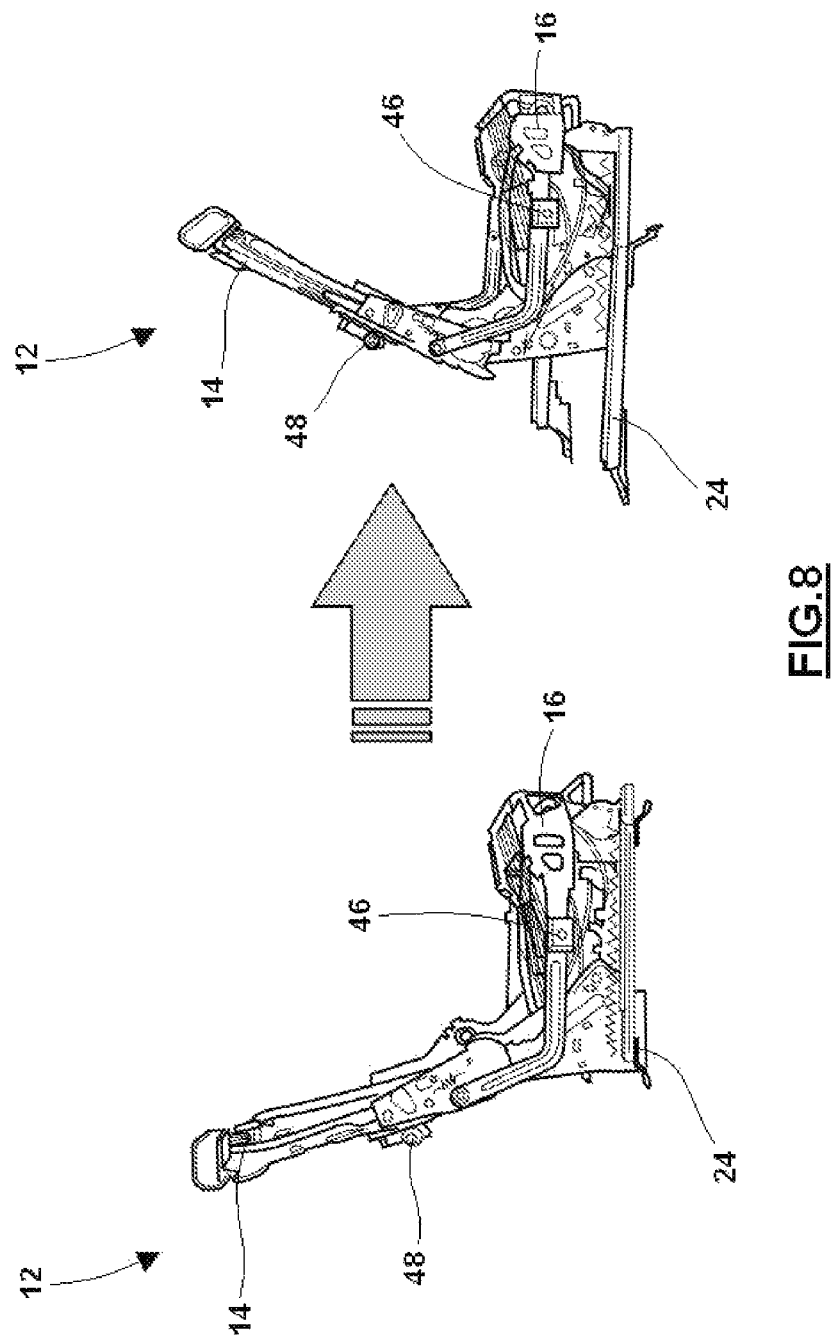
FIG. 8 is a progression of side views of the vehicle seat of FIG. 6 articulated from a design position to an easy entry position.
Figure 10:
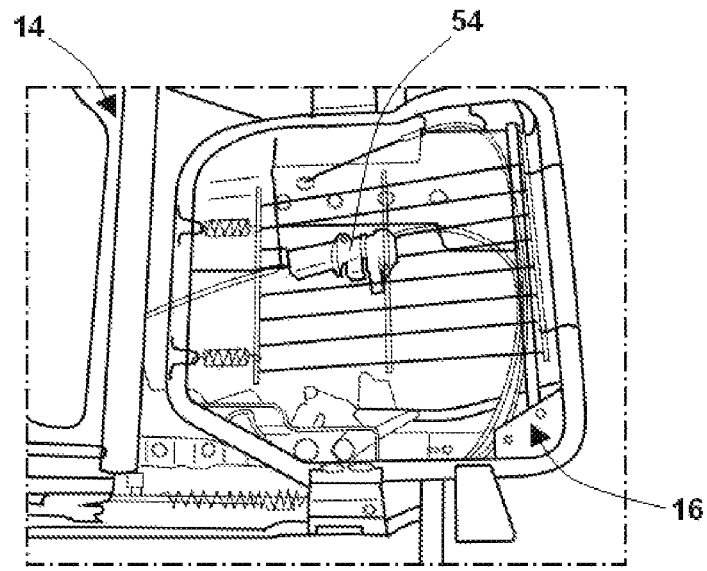
FIG. 10 is a partial enlarged top view of the seat base of the vehicle seat of FIG. 6 including a power actuator.
Figure 11:
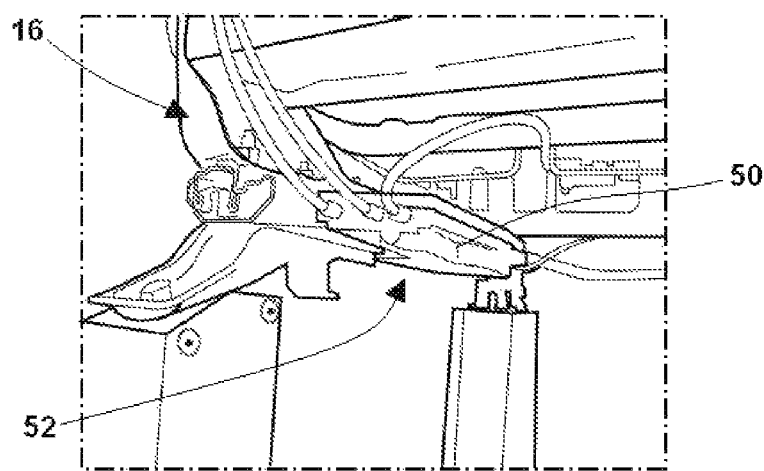
FIG. 11 is a rear underside view of the seat base of the vehicle seat of FIG. 6 including a torque converter and energy storage device.
Figure 22:
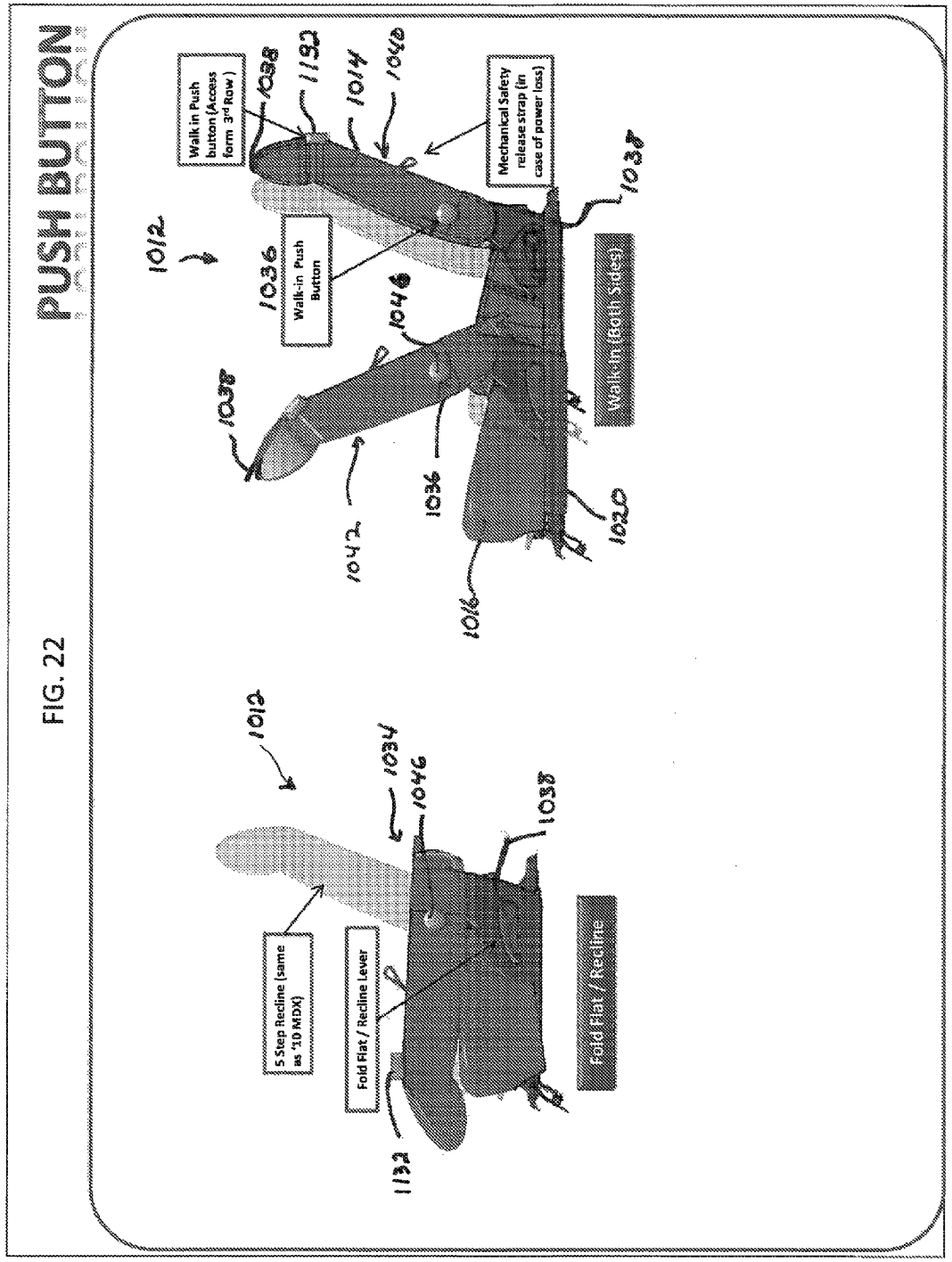
FIG. 22 is a diagram of a vehicle seat having an electro-mechanical push button actuator, according to yet a further embodiment.
Figure 23:
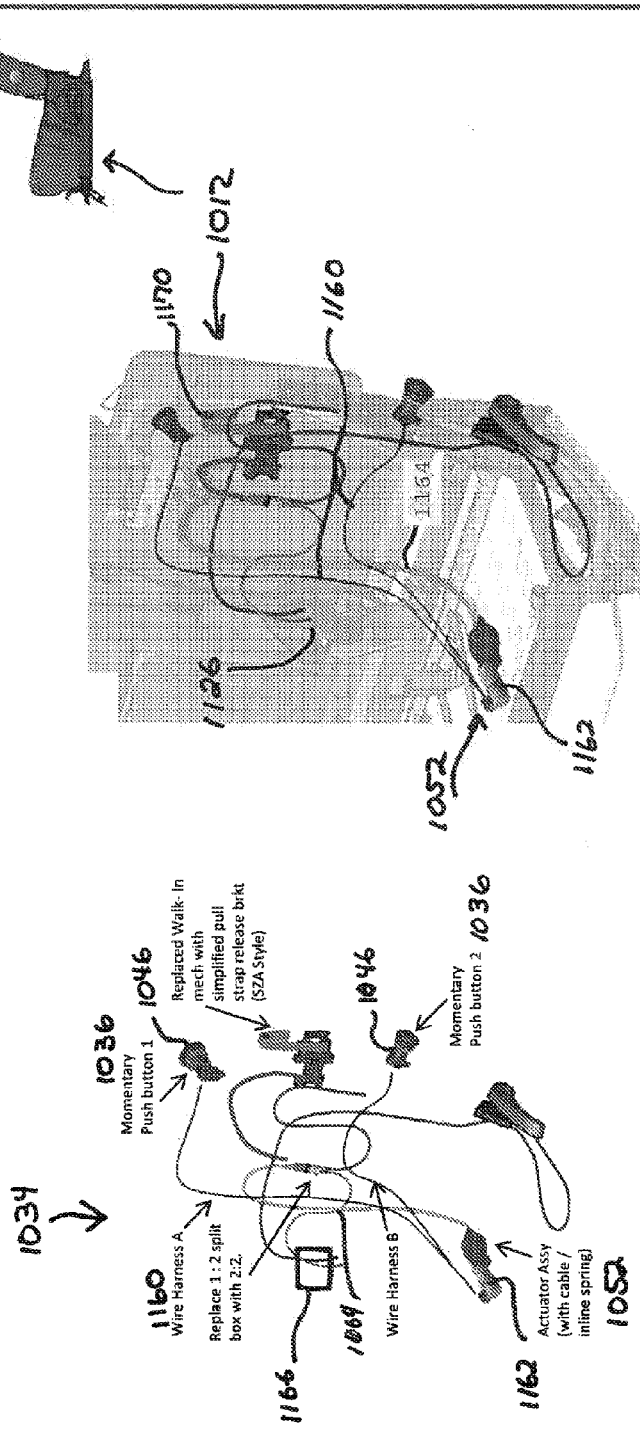
FIG. 23 is a diagram of the electro-mechanical push button actuator for the vehicle seat of FIG. 22, according to an exemplary embodiment.

Referring now to FIGS. 6-11, a vehicle seat 12 having a actuator mechanism 34 for operating, such as by, articulating, adjusting, moving, folding, repositioning, sliding, or the like, the vehicle seat is shown. The actuator mechanism 34 can be utilized to assist in adjusting the vehicle seat 12 to and from various positions, such as, a first position to a second position; a use position, a design position, an easy-entry position, a fold flat position, or the like. For example, if the mechanism 34 is utilized to assist in movement of a vehicle seat 12 to a folded position, the mechanism stores energy as the seat 12 is folded upwardly to a use position, and releases the energy to assist in moving the seat 12 from a use position to a folded position. The actuation mechanism 34 includes a first and second actuator 46, 48, a torque converter 50, an energy storage device 52, and a power actuator 54. The actuator mechanism 34 can be electronically activated, such as by an electric switch, or mechanically activated, such as by a manual push button, or a combination thereof. In one example, the first actuator 46 can be a manual push button located on the inboard or outboard side of the seat back 14, as shown in FIGS. 6 and 7. Actuating the first actuator 46 causes the seat back 14 to move, such as by tilting, pivoting, rotating, or the like, forward and the seat 12 to move, such as by sliding, or the like, forward along the track assembly 24 from a use or design position to an easy-entry position that facilitates vehicle 10 ingress and egress, as shown in FIG. 8. Whereas, the second actuator 48 can be an electrical switch located on the inboard or outboard side of the seat cushion 16, as shown in FIGS. 6 and 9. Actuating the second actuator 48 causes the seat back 14 to move, such as by tilting, pivoting, rotating, or the like, forward and rest substantially flat on the top surface of the seat cushion 16 from a design position to a fold flat position that facilitates vehicle 10 ingress and egress and/or enhances vehicle 10 cargo space. The energy storage device 52, power actuator 54, and torque converter 50 can be located under the seat cushion 16 and to either the inboard or outboard side of the seat 12, as shown in FIGS. 10 and 11. The energy storage device 52, power actuator 54, and torque converter, such as a logic box, 50 provide for a mechanism 34 that easily actuates the seat 12 with reduced efforts by utilizing the energy stored in the storage device 52. The manual or electrical switches can be actuated in any combination and can be used for any suitable application, such as first row seats, bench seats, driver's seat, passenger seat, or the like and can be used to adjust the seat 12 to and from any seating position, such as design, use, easy-entry, fold flat, fold and tumble, or the like. In one example, the actuator mechanism 34, or the first actuator, or the second actuator, can be remotely activated, such as by using a keyfob, or the like. Another example of the actuator mechanism is described with respect to FIG. 22-24.

Figure 12:
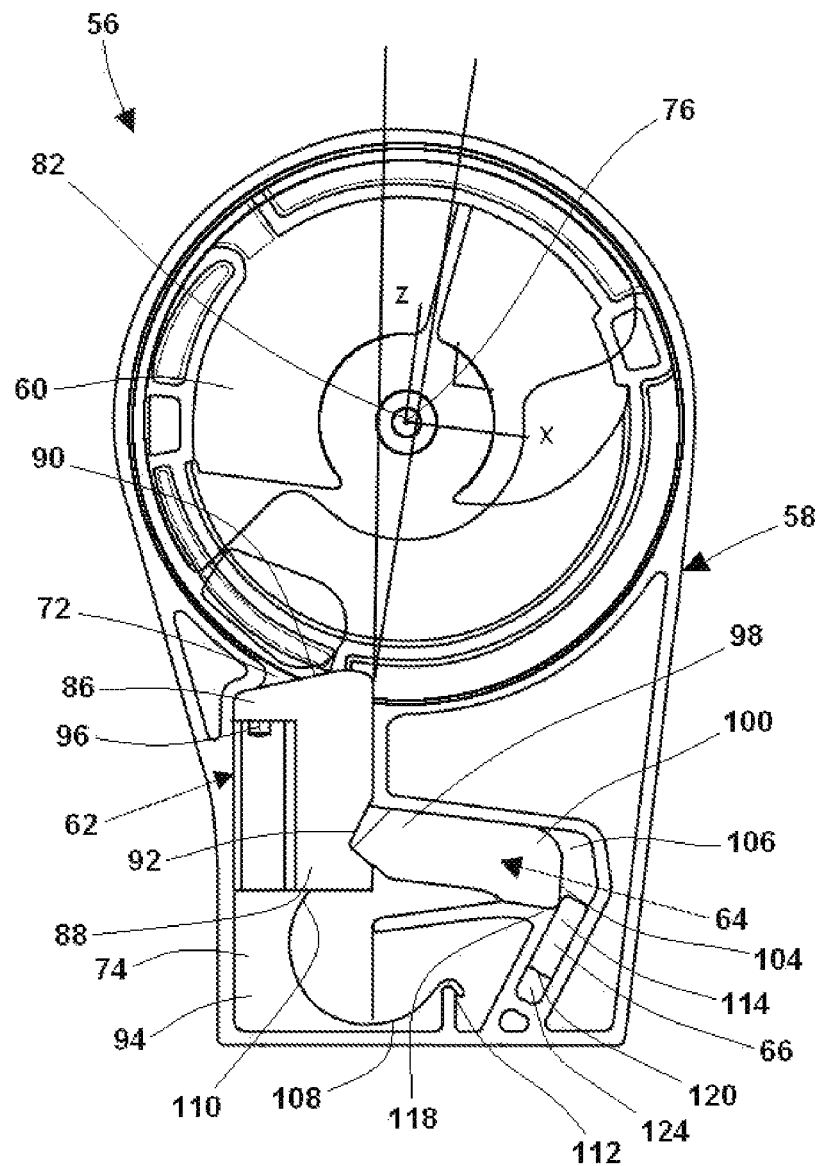
FIG. 12 is a side view of an energy storage bypass mechanism, according to an exemplary embodiment.

Referring now to FIG. 12, an energy storage bypass mechanism 56 for use in a vehicle seat 12 is shown. The energy storage bypass mechanism 56 includes a housing 58, a rotator or pivot member 60, a slide block or rack member 62, a pinion member 64, an interlock member 66, biasing members 68, cable members 70, and one or more recliner activation devices 72 to be described in further detail below. The energy storage bypass mechanism 56 can be coupled to the vehicle seat 12, such as, the seat back, seat base, or the like, and can be positioned in any suitable location, such as, within seat, under the seat, against the seat, outboard side, inboard side, or the like.

The housing 58 includes an inner area or space 72 having a plurality of contoured features 74, such as extension members, sides, walls, embossments, channels, grooves, ridges, or the like, for housing/enclosing, supporting and guiding the inner components of the energy storage bypass mechanism 56, such as the rotator member, slide block member, pinion member, interlock member, biasing member, or the like, and a central aperture 76. The housing 58 can also include a plurality of attachment members or brackets 78, and/or fasteners 80 for coupling to other structures, such as the energy storage bypass mechanism components, vehicle seat structures, or the like. The housing 58 can be made of any suitable material, such as plastic, metal, or the like.

The rotator/pivot member 60 is substantially circular in shape and includes a central aperture 82 for rotatable coupling to the housing 58 via the central aperture 76 and vehicle seat 12. It is contemplated, however, that the rotator/pivot member 60 may have other suitable shapes and also be designed to operate/function in a different manner, such as linearly, as a cam, rotating stop feature, or the like. The rotator/pivot member 60 is preloaded with a biasing member, such as a spring, or the like. The biasing member acts as an energy storage mechanism and that biases the rotator/pivot member 60 in a predetermined direction, such as clock-wise, counter-clockwise, or the like, to facilitate reconfiguration of the vehicle seat 12 with minimal effort when the slide block member 62 is disengaged from the rotator/pivot member 60.

The slide block member 62 includes a first end 86 and a second end 88. The first end 86 has an inclined feature 90, such as a surface, edge, profile, or the like, for engaging the rotator member 60. The second end 88 includes an attachment area 92 for attachment to the pinion member 64 via the attachment member or clip. The slide block member 62 is positioned within a first channel 94 in the housing 58 such that the slide block 62 can move, such as by sliding, toggling, or the like, in a first and second direction, such upward, downward, or the like, when activated by the pinion member 64. The slide block member 62 also includes a biasing member 96, such as a spring, F-Spring, or the like, that biases the slide block member 62 in an upward direction to maintain the slide block member 62 in engagement with the rotator/pivot member 60.

The pinion member 64 is a substantially elongated member having a first end 98 and a second end 100. The first end 98 includes a biasing member 102, such as a clip, or the like, for coupling to the slide block member 62. The second end 100 includes a feature 104, such as a surface, edge, profile, or the like, 104 for engagement with the interlock member 66. The pinion member 64 is positioned within the housing 58 in a channel 106 substantially perpendicular to the slide block member channel 94 such that the pinion member 64 can move, such as by sliding, toggling, or the like, in a first and second direction, such as fore and aft, forward and rearward, or the like, when disengaged from the interlock member 66. The pinion member 64 also includes a biasing member 108 having a first end 110 and a second end 112. The first end 110 is coupled to the pinion member 64, whereas the second end 112 is coupled to the housing 58. The biasing member 108 creates a biasing force on the pinion member 64 in a predetermined direction, such as an upward and left direction, or the like.

The interlock member 66 is a substantially elongated member having a first end 114 and a second end 116. The first end 114 includes a feature 118, such as a surface, edge, profile, or the like, for engagement with the pinion member 64. The second end 116 includes a surface 120 for attachment to a biasing member 122, such a spring, or the like, that biases the pinion member 64 away from the slide block member 62. The interlock member 66 is positioned within the housing 58 in a third channel 124 substantially perpendicular to the pinion member channel 106 such that the interlock member 64 can move, such as by sliding, toggling, or the like, in a first and second direction, such as upward and downward, or the like, when activated. When the vehicle seat 12 is unoccupied, the interlock member 66 is in engagement with the pinion member 64 thereby enabling the pinion member 64 to be in engagement with the slide block member 62. In turn, enabling the energy storage bypass mechanism 56 to be released if activated. Conversely, when the vehicle seat 12 is occupied, the interlock member 66 is disengaged from the pinion member 64 and the pinion member 64 is disengaged from the slide block member 62 thereby preventing the slide block member 62 from being disengaged from the rotator/pivot member 60 and hence preventing the energy storage mechanism 56 from being released if activated. This feature acts as a safety lockout which renders the energy storage mechanism 56 ineffective if activated.

The recliner activation device 126 activates the energy storage mechanism 128 thereby enabling the vehicle seat 12 to be reconfigured from a design position to a dump or easy entry position for facilitating ingress and egress from the vehicle 10. The recliner energy storage mechanism 128 can have one or more handles, levers, buttons, switches, and/or the like to activate the recliner energy mechanism 128. One or more recliner activation devices 130 can be implemented and the recliner activation devices 130 can be coupled in a variety locations on the vehicle seat 12, such as the seat back, seat base, rear surface of the seat back, outboard or inboard side of the seat base, or the like, that are conveniently and easily accessed by the vehicle 10 occupants.

Figure 13:
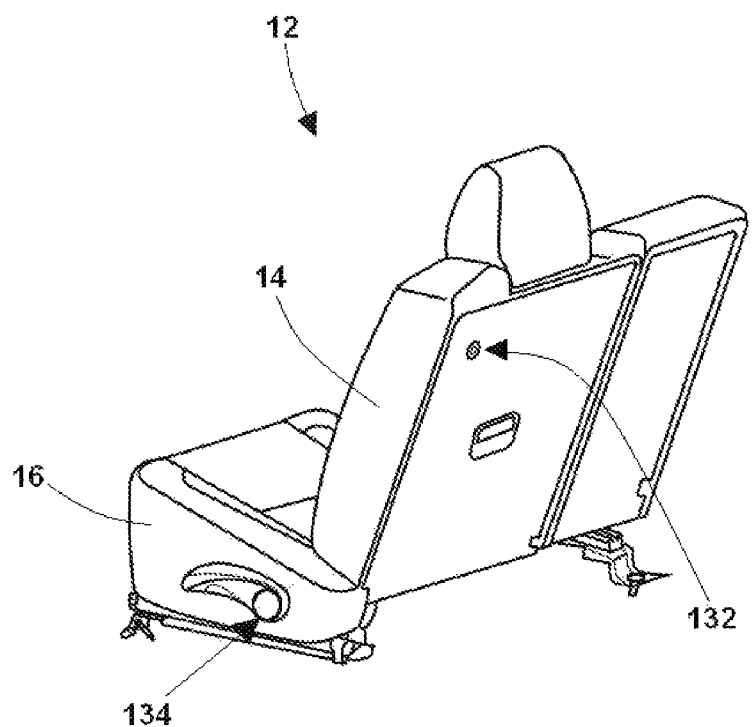
FIG. 13 is a perspective view of seat assembly having an energy storage bypass mechanism, according to an exemplary embodiment.
Figure 19A:
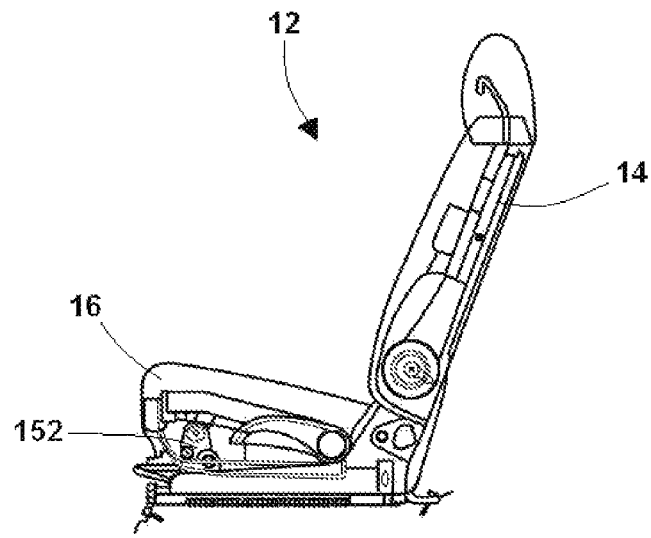
FIGS. 19A-19B are diagrams of a seat occupant detection system, according to still another embodiment.
Figure 19B:
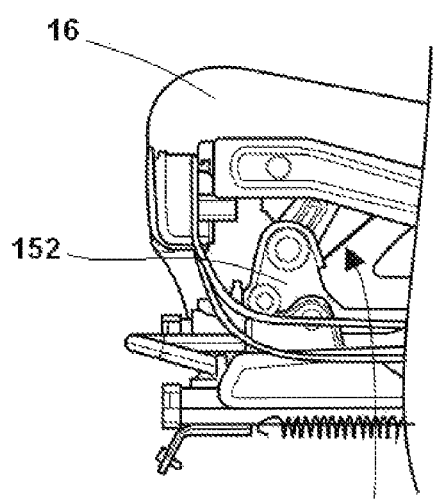

Referring now to FIG. 13, a vehicle seat assembly 12 having the energy storage bypass mechanism 56 of the present disclosure is shown. In one example, the vehicle seat assembly 12 includes a first recliner activation device 132, such as a button, lever, handle, or the like, mounted on the rear surface of the seat back 14 that can be accessed by vehicle occupants, such as occupants in the third row of the vehicle, or the like, and a second recliner activation device 134, such as a button integrated with the seat back recliner lever, or the like, mounted on the side of the seat base 16 that can be accessed from outside the vehicle 10.

Referring now to FIGS. 14A-14C, a series of side views of the energy storage bypass mechanism 56 in various modes are shown. In the initial mode at 136, the interlock member 66 is in engagement with the pinion member 64 which maintains the slide block member 62 in engagement with the rotator/pivot member 60 thereby maintaining the energy storage mechanism 56 in engagement, such as latched, locked, or the like. When the vehicle seat 12 is unoccupied and the recliner activation device 130 is activated, the interlock member 66 remains in engagement with the pinion member 64 and causes the slide block member 62 to disengage from the rotator/pivot member 60 thereby disengaging the energy storage bypass mechanism 56 thereby enabling the stored energy in the energy storage mechanism 128, via, the rotator/pivot member, to be released and thereby enabling the vehicle seat 12 to be reconfigured. When the vehicle seat 12 is occupied and the recliner activation device 130 is activated, the interlock member 66 is disengaged from the interlock member 66 thereby preventing the stored energy in the energy storage mechanism 128 from being released thereby preventing safety issues when the energy storage mechanism 128 is released while the vehicle seat 12 is occupied.

Referring now to FIGS. 15A-15D, a progression of side views of the energy storage bypass mechanism 56 and corresponding seat configuration transitioned between a design position and a reclined position and back to a design position are shown. When the recliner activation device 132 is activated, the slide block member 62 is pulled downward out of engagement with the rotator/pivot member 60 via the pinion member 64 thereby disengaging the energy storage bypass mechanism 56. This releases the stored energy in the rotator/pivot member biasing member enabling the vehicle seat 12 to be reconfigured into an EZ entry position such that the seat back rotates forward and the vehicle seat moves/slides in the forward direction with minimal effort to facilitate vehicle 10 ingress and/or egress. The biasing member 84 is preloaded such that when the vehicle seat 12 is moved back into the design position the energy storage bypass mechanism 56 reengages or resets and is ready to be activated once again.

Referring now to FIGS. 16A-16B, two side views of an occupied seat 12 and of the energy storage bypass mechanism 56 transitioned from a non-activated to an activated mode are shown. When the seat 12 is occupied the interlock member 66 is pulled downward and is disengaged from the pinion member 64. Thus, when the recliner activation device 132 is activated, the pinion member 64 moves over away from the slide block member 62 instead of pulling on the slide block member 62 thereby disengaging the energy storage bypass mechanism 56. Although this is one way of stopping forces transferring from cable input to slide block member 62, other techniques can be employed and are contemplated, such as a stop feature in the cable where it can slide in the housing 58 when the stop is removed.

Figure 20:
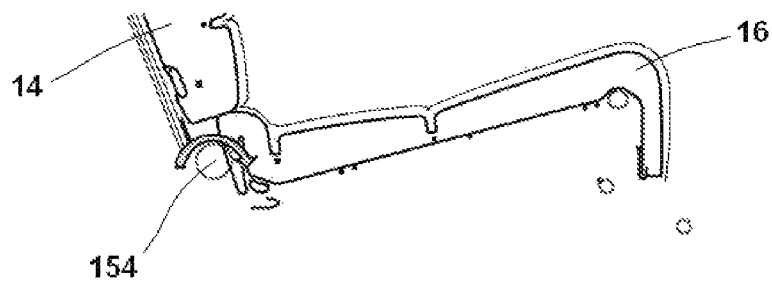
FIGS. 20 and 21 are diagrams of a seat occupant detection system, according to yet another embodiment.
Figure 21:
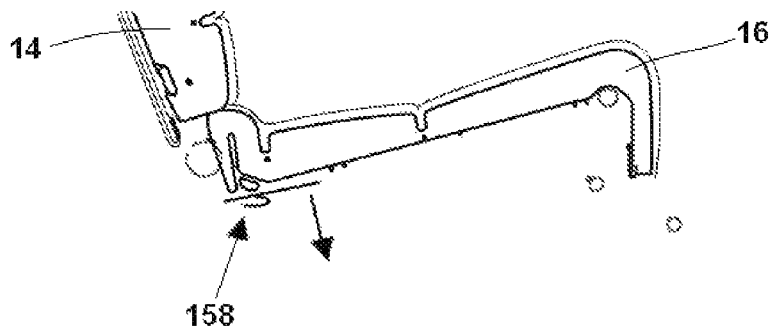

Referring now to FIGS. 17-21, seat 12 occupant detection systems 146 are shown. The seat occupant detection systems 146 regulate the engagement or disengagement of the energy storage bypass mechanism 56 depending on whether the seat 12 is occupied or unoccupied. In one example, a cable 70 can be placed across the top surface 148 of the seat 12, such as the seat base, seat back, or the like, and coupled to the interlock member 66, as shown in FIG. 17. Once the seat 12 is occupied, the weight of the occupant causes the cable 70 to be pulled causing the interlock member 66 to disengage from the pinion member 64 thereby preventing the recliner from disengaging. In another example, a cable 70 can be placed across the suspension surface 150 of the seat 12, such as the seat base wiring/frame, or the like, and coupled to the interlock member 66, as shown in FIG. 18. Once the seat 12 is occupied, the weight of the occupant would cause the cable 70 to be pulled causing the interlock member 66 to disengage from the pinion member 64 thereby preventing the recliner from disengaging. According to yet another example, a cable 70 can be coupled to the front link 152 of the vehicle seat 12 and to the interlock member 66, as shown in FIG. 19A-19B. Once the seat 12 is occupied, the weight of the occupant would cause the cable 70 to be pulled causing the interlock member 66 to disengage from the pinion member 64 thereby preventing the recliner from disengaging. Similar techniques can be employed using a spring loaded drum 154 and cable system (as shown in FIG. 20), a cable and slot system 156, and a triggering device 158 under the vehicle seat 12 (as shown in FIG. 21).

Referring to FIGS. 22-25, an electro-mechanical actuation mechanism 1034 for a vehicle seat 1012 is illustrated. Like features have like reference numbers, increased by 1000. The actuation mechanism 1034 includes a first and second seat actuator 1036 and 1038 respectively, for the purpose of actuating the vehicle seat 1012 in the manner previously described. Either one of the first seat actuator 1036 or second seat actuator 1038 may be actuated using a corresponding push button 1046 or 1048, as previously described. In this example, either one of the push buttons 1046, 1048 is a manual type button, such as a button that is depressed or pushed to operate. However, the first actuator 1036 or second actuator 1038 could be actuated by other types of handles, such as a lever, push button, toggle, or the like, depending on various factors such as packaging, ergonomics, accessibility, cost, or the like.

The first push button 1046 associated with the first seat actuator 1036 may be located on a side portion of the seat back 1014 or on the seat base 1020. Other locations on the seat 1012 for the push buttons, are contemplated, and the seat may include more than one first push button 1048, each positioned at various locations on the seat 1012, and operatively connected. The second push button 1048 associated with the second seat actuator 1038 may likewise be of a push button type, and selectively positioned on the seat 1012.

The actuation mechanism 1034 includes an energy storage device 1052 that is operatively in communication with the first actuator 1036 via an electrical connection, such as the wired connection shown at 1160. For example, the wired connection 1160 may be part of a wiring harness associated with operation of the seat 1012. If there is a plurality of first push buttons 1046, then each first push button 1046 is electrically connected to the energy storage device 1052. In this example, the energy storage device 1052 is an actuator, such as a motor as shown at 1162. Various types of actuators or motors 1162 may be utilized, such as a linear motor, a rotary motor, a solenoid, or the like. The motor may be positioned in a convenient location, such as under the seat cushion 1016, or the like.

The motor 1162 is operatively connected to a force transmitting device 1164. An example of a force transmitting device 1164 is a push-pull cable, a rod, or the like. One end of the force transmitting device 1164 is operatively connected to an output member of the motor, and an opposed end of the force transmitting device is operatively connected to the recliner activation device shown at 1166 that is associated with the first seat actuator. The seat release mechanism 1166 operatively actuates the seat to move the seat back 1014 to a forward or tipped position, and the entire seat 1012 is moved or slid forward on the seat track assembly 1024, as previously described with respect to an easy entry position that facilitates vehicle ingress and egress. In addition, the seat assembly 1012 may include a handle shown at 1170 that provides an emergency release if there is no power.

In operation, the push button 1046 is actuated, such as by a depressing movement, and a signal is transmitted to the energy storage device 1052 or motor of this example via the wired connection 1160. The motor is energized, and transmits a force to the force transmitting device 1164, or cable of this example, resulting in a linear displacement of the force transmitting device that actuates the seat release mechanism 1166 to move the seat back into the second position by tipping the seat back and displacing the seat assembly in a forward direction along the track. Advantageously, minimal effort is necessary to actuate the seat between the use position 1040 and the first position 1042.

The electromechanical actuation mechanism 1034 may be operatively in communication with the previously describe energy storage bypass mechanism 56 for transitioning the seat between a design or use position, a reclined position and back to the design position as previously described.

Referring to FIG. 26, a method of operating the actuation mechanism 1034 is described. Advantageously, this methodology prevents unintended operation of the actuation mechanism, such as when the push button 1046 is inadvertently actuated. The methodology begins in block 1200 with the step of connecting the energy storage device 1052, or actuator 1162 of this example with a power source 1172. An example of a power source is a battery. The methodology advances to block 1205 and a user activates the push button 1046 to send a signal to the actuator 1062 via the wired connection.

The methodology advances to block 1210, and the actuator 1062 determines whether the signal is an intended or unintended signal. For example, if a sensor senses an occupant in the seat, the actuator will determine that the signal is an unintended signal. In another example, the duration of the signal may be measured, and if the duration exceeds a predetermined period of time, the actuator will determined that the signal is an unintended signal. Other techniques for determining whether the signal is intended or unintended are contemplated. If determined that the signal is an unintended signal, then the actuator is not energized. If determined that the signal is an intended signal, the methodology advances to block 1215.

In block 1215, the actuator is energized, and transmits a force to the three transmitting device 1164 or cable of this example. The cable travels linearly within a housing, i.e., the cable is pulled. The methodology advances to block 1220 and the pulling motion of the cable releases the seat release mechanism 1166, also referred to as the recliner mechanism, to initiate movement of the seat from the use position to the tipped position, and the seat assembly is displaced in a forward direction along the seat track. The reclined seat position provides for ingress and egress, such as from a third row of seats. The methodology advances to block 1225 and the seat is returned to the nominal or use position. For example, a user may grasp the seat and return the seat back to an upright position while moving the seat assembly in a rearward direction along the track. Alternatively, the seat assembly return may be electro-mechanical, via an opposed movement of the force transmitting device.

It should be appreciated that the second seat actuator 1038 may be similarly operated using a push button and motor to operatively move the seat 1012 such that the seat back 1014 is folded forward and the seat back 1014 rests substantially flat on the top surface of the seat cushion in the fold flat position as previously described.

Many modifications and variations of the present disclosure are possible in light of the above teachings. Therefore, within the scope of the appended claim, the present disclosure may be practiced other than as specifically described.

What is claimed is:

1. A seat for use in a vehicle, the seat comprising:
    a seat base having a cushion and a seat back pivotably coupled to the seat base by a recliner mechanism, such that the seat back can be pivoted in a forward and rearward direction relative to the seat base;
    a track assembly coupled to the vehicle and the seat that moves the seat in the forward and rearward directions relative to the vehicle,
    a first electromechanical push button actuator located on the seat, the first actuator operable to actuate the seat such that the seat is moved from a use position to an easy entry position in which the seat back is tipped in a forward direction and the seat is slid forward on the track assembly;
    a second actuator operable to actuate the seat such that the seat is moved from a use position to a fold flat position in which the seat back is folded forward and rests flat on a top surface of the cushion;
    an energy storage device for storing energy generated from movement of the seat and selectively releasing stored energy to assist in repositioning the seat when at least one of the first and second actuators is actuated;
    a force transmitting device having one end connected to the first actuator and a second end connected to the recliner mechanism, such that energizing the first actuator actuates the force transmitting device to release the recliner mechanism and move the seat from the use position to the easy entry position; and an energy storage bypass mechanism that prevents release of stored energy from the energy storage device when the seat is occupied and enables release of stored energy from the energy storage device when the seat is not occupied.

2. The seat of claim 1, further comprising an emergency release handle that is operatively connected to the recliner mechanism, and disengages the recliner mechanism when pulled thereby enabling the seat to be adjusted.

3. The seat of claim 1, wherein the first actuator is activated remotely outside the vehicle using a key fob.

4. The seat of claim 1, wherein the energy storage bypass mechanism further comprises:

a housing;

a pivot member disposed within the housing and coupled to the energy storage device and having a central aperture, wherein the pivot member is pivotably coupled to the housing and the seat, and the energy storage device biases the pivot member in a predetermined direction;

a slide block member slidably disposed within the housing and having a first end and a second end, the first end having a surface for engagement with the pivot member;

a pinion member disposed within the housing and having a first end and a second end, the first end having a biasing member for coupling to the slide block member, an interlock member disposed within the housing and having a first end and a second end, wherein the first end includes a surface for engagement with the pinion member and the second end includes a surface having a biasing member that biases the pinion member away from the slide block member such that the interlock member is in engagement with the slide block member when the seat is occupied, thereby enabling the energy stored in the energy storage device to be released upon actuation of at least one of the first actuator and the second actuator and the interlock member is disengaged from pinion member and the pinion member is disengaged from the slide block member when the seat is occupied, thereby preventing the slide block member from being disengaged from the pivot member and thereby preventing the energy stored in the energy storage device from being released upon actuation of at least one of the first actuator and the second actuator.

5. The seat of claim 1, further comprising:

a seat occupation detection system for regulating engagement and disengagement of the energy storage bypass mechanism.

6. The seat of claim 1, wherein the force transmitting device is a push-pull cable.

7. The seat of claim 1, further comprising a seat occupant detection system that detects the presence of an occupant in the seat and regulates engagement and disengagement of an energy storage bypass mechanism depending on whether the seat is occupied or unoccupied.

8. The seat of claim 7, wherein the seat occupant detection system includes a cable placed across a portion of the seat and is operatively engaged to the energy storage bypass mechanism, such that the weight of an occupant causes the cable to be pulled to deactivate the energy storage bypass mechanism and prevent disengagement of the recliner mechanism.

9. The seat of claim 8, wherein the cable is placed across a suspension surface of the seat base.

10. The seat of claim 1, wherein the first actuator is a linear motor, a rotary motor, or a solenoid.

* * * * *